2,806,792
PROCESSING OF POULTRY

James K. Cameron, Pocomoke City, Md., assignor to General Foods Corporation, White Plains, N. Y., a corporation of Delaware No Drawing. Application June 9, 1954,
Serial No. 435,603

9 Claims. (Cl. 99—107)

The present invention relates to the processing of poultry such as chickens, geese, ducks, turkeys, and the like, and more particularly to an improvement in such processing which quickly and simply provides dressed or finished poultry of increased tenderness, especially in the case of frozen poultry.

The objects of the present invention include the provision of finished poultry products of increased tenderness by a rapid tenderizing process, particularly in those cases where the products are to be quick frozen, while permitting the use of the presently employed mass production techniques relating particularly to killing, plucking and evisceration of the poultry.

In the processing of poultry by mass production methods it is customary to kill the birds by slitting their throats which permits them to be bled. The birds are thereafter scalded at a temperature as high as 140° F. or at a lower temperature, say, 128° F., after which the feathers are removed by mechanical plucking machines. Plucking is followed by cleaning, and it is customary then to chill or cool the birds by soaking them in ice water for a period of, say, 2 hours. The chilled birds are then eviscerated and cut up or otherwise processed depending upon whether roasters, fryers or parts are desired.

It is well known that braining is also resorted to in connection with killing the birds for ease of plucking. Braining, however, is not adaptable to mass production methods and therefore cannot be generally employed. Other means for conditioning the birds for plucking are required.

The 128° F. temperature of scalding, or semi-scalding, is usually employed by the packers of fresh or iced poultry because it permits the retention of the epidermis or outer layer of skin which is very important from the standpoint of being able to store and handle the birds; retention of the epidermis prevents drying and discoloration of the birds. The higher temperature of 140° F., sub-scalding, is usually employed by frozen food processors who are interested in removal of the epidermis because (1) a cleaner looking bird results, and (2) the mechanical plucking and removal of pin feathers are greatly facilitated. A scalding temperature of 160° F., hard scalding, is used in processing old poultry and roosters designed to be boiled, or otherwise cooked, and then canned. Hard scalding is not used to any great extent today.

It is, of course, desirable that the flesh or meat be tender. The aging of freshly killed birds in the course of commercial distribution generally results in their flesh having the desired tenderness. However, natural aging is slow, and, in a food industry using mass production methods, reduction of the time required in processing is required. This is particularly true in the frozen food industry where birds are frozen shortly after being killed, plucked and eviscerated so that the meat does not receive the benefits of aging received by other dressed poultry. Accordingly, it is required that a process be employed for fresh killed poultry which results in a tender product without consuming too great a period of time in the tenderizing operation.

It has now been discovered that poultry products of increased tenderness can be provided if a holding period is employed immediately after killing the bird and before plucking, eviscerating, cutting, and like processing steps. This holding period permits certain natural processes, believed to be enzymatic, to take place. The present process is ideally suited to mass production since it is relatively quick and simple. However, it has also been found that the holding of the birds after killing and without plucking, i. e., "in the feather," causes the birds to hold their feathers. This would have presented a problem in connection with subsequent mechanical plucking, but a further discovery of the present invention is that this plucking problem can be largely, if not entirely, removed by maintaining certain temperature and moisture conditions during the holding period. By maintaining such temperature and moisture conditions the skin is prevented from shrinking or tightening due to the process of rigor mortis, which otherwise would give difficulty in connection with plucking.

It has been found that the aforementioned holding period for these natural processes provides the desired degree of tenderness if within the range of ½ to 6 hours. Use of periods of time less than ½ hour does not provide a sufficient degree of tenderizing to make use of the holding period worthwhile; the use of periods of time greater than 6 hours is not only impractical from the standpoint of mass production methods, but also it has been observed that holding for periods longer than 6 hours results in the skin of the bird becoming excessively soft so that there is an undue amount of skin breakage occurring in the mechanical plucking. It is preferred to employ a holding period of about ½ to 4 hours, the most preferred period being about 2 hours.

The preferred temperature range for the holding period is defined by that temperature at which tightening of the skin causing difficulty on subsequent plucking is prevented, this being about 95° F., and the temperature at which inactivation of the enzymes, believed to bring about tenderizing, begins to become excessive, viz. 125° F. In other words, between about 95° F. and about 125° F. the temperature is sufficiently elevated to permit tenderizing to take place while conditioning the bird for subsequent plucking. Accordingly, the preferred temperatures within which the birds should be maintained during the holding period are about 95°–125° F., with a still more preferred range of about 100°–110° F., and the most preferred temperature being about 105° F.

The conditions of moisture which should be maintained during the aforementioned holding period are those equivalent to about 75–100% R. H. These conditions, of course, embrace soaking the birds by immersion in water. Maintaining a relative humidity of 100% is the substantial equivalent of immersion and it is preferred since it provides greater ease of operation, particularly with regard to cleanliness, expense of installation, maintenance, and the like.

In employing a controlled relative humidity as opposed to using soaking, it is preferred to first dip the birds in water, preferably containing a suitable surface active agent such as the sulfated alkyl alcohols, alkyl sodium sulfosuccinates, alkyl sodium sulfonates, polyoxyethylene fatty acid esters, sorbitan fatty acid esters, polyoxyethylene sorbitan fatty acid esters, and sodium or potassium soaps of higher fatty acids. Such surface active agents assist in completely wetting the skin of the birds. Complete wetting is desired for the reason that it has been found that subsequent control of moisture conditions or humidity will have maximum effectiveness in maintaining the feathers easily removable. It has also been found that it is best to maintain the pH of the soak water, whether it is used during the entire tenderizing period or merely as a preliminary dip, at a pH within the range of 7.5–8.5, preferably 8.0. Likewise, any sprays which may be used in a constant humidity chamber to maintain the humidity, should also employ water within this pH range.

A method has been developed for objectively determining the tenderness of the poultry flesh. This method was used in evaluating the results of the present process and involves the adaptation of the shear press developed by A. Kramer of the University of Maryland and is described by A. Kramer, G. J. Burkhardt and H. P. Rogers in an article entitled "The shear press; a device for measuring food quality," in The Canner, vol. 112, No. 5, pp. 34–40 (1951). Briefly, the device comprises a box having grid sections in the top and bottom of the box which serve as the female members of a die. The male die member is operated by hydraulic pressure to go through the top and bottom grid members of the box. The device has been adapted to the measurements of the tenderness of poultry flesh by taking, for example, a cooked chicken breast and shredding it into pieces about the size of a lead pencil and laying said pieces across the bottom grid of the box. The male die member is forced through the layer of chicken flesh and the grid member beneath it. The force in pounds required to shear the sample is noted on a gauge in the system. The tenderness is expressed as the shear value in terms of this force in pounds per gram of chicken flesh distributed across the lower grid member, the lower shear values indicating greater tenderness.

Using the above device it has been found that the shear values for breast meat of chicken processed by previously employed techniques can be as high as 30–45 lbs./gram. Such processing techniques include killing the birds by slitting their throats so as to permit bleeding, scalding at a temperature of about 140° F., plucking the feathers mechanically, eviscerating, cutting-up if desired, packaging and freezing. To determine the tenderness of the birds processed in this manner, the last two steps are eliminated and the breast meat, for example, is cooked 18 minutes in deep fat at about 203° F., after which it is shredded and the shear value is determined as above-described.

The importance of tenderizing at the earliest point in the process is shown by the results of a series of experiments set forth below. In these experiments the standard procedure described immediately above was used in processing chickens except in that the tenderizing step was inserted at various stages in the procedure. The tenderizing was effected by holding the chickens for about 2 hours at about 105° F. and about 100% R. H. Where the tenderizing step preceded the mechanical plucking step the chickens were first dipped in water containing a surface active agent and then held at about 100% R. H. Sprays were used to maintain this humidity and the pH of the dip water and also of the spray water was about 8.0. In every case the chickens after being cut up were cooked for 18 minutes in deep fat at about 203° F. and the tenderness of the breast meat was then determined using the shear press described above. The data obtained clearly indicate that the tenderizing step should be employed after killing and bleeding the birds and before further processing, preferably immediately after killing and bleeding. The results of the experiments are summarized below:

| Process | Shear Value (lbs./g.) |
| --- | --- |
| Kill, bleed, scald at 140° F., mechanically pluck, eviscerate, cut up | 31.2 |
| Kill, bleed, scald at 140° F., mechanically pluck, eviscerate, cut up, tenderize | 24.2 |
| Kill, bleed, scald at 140° F., mechanically pluck, eviscerate, tenderize, cut up | 20.9 |
| Kill, bleed, scald at 140° F., mechanically pluck, tenderize, eviscerate, cut up | 18.2 |
| Kill, bleed, tenderize, scald at 140° F., mechanically pluck, eviscerate, cut up | 12.6 |

While the present invention has been described with particular reference to specific embodiments and details, it is not to be construed as limited thereby but reference should be had to the appended claims for a definition of the scope of the invention.

I claim:

1. In the process of killing, plucking, and eviscerating poultry, the improvement comprising tenderizing the flesh by holding the poultry after killing and before plucking for a period of ½ to 6 hours at a temperature not greater than 125° F., and conditioning the skin of the poultry to facilitate removal of the feathers after said period by mechanical means by maintaining the temperature during said period at not less than about 95° F.

2. The process of claim 1 in which the holding period commences substantially immediately after killing the poultry.

3. The process of claim 1 in which the time of holding is within the range of about ½–6 hours, the temperature is within the range of about 95°–125° F., and the humidity is within the range of about 75–100% relative humidity.

4. The process of claim 1 in which the time of holding is within the range of about ½–4 hours, the temperature is within the range of about 100°–110° F., and the humidity is about 100% relative humidity.

5. The process of claim 1 in which the time of holding is about 2 hours, the temperature is about 105° F., and the humidity is about 100% relative humidity, the holding period commencing after dipping the poultry in water to fully wet the skin thereof.

6. The process of claim 3 in which the holding period is commenced after dipping the poultry in water to fully wet the skin of the poultry.

7. The process of claim 6 in which a surface active agent is employed in the dip-water to insure fully wetting the skin of the poultry.

8. The process of claim 3 in which the water employed in maintaining the humidity specified is of a pH within the range of about 7.5–8.5.

9. The process of claim 6 in which the dip-water is maintained at a pH within the range of about 7.5–8.5.

References Cited in the file of this patent

UNITED STATES PATENTS

| | | |
| --- | --- | --- |
| 2,214,562 | McCadam et al. | Sept. 10, 1940 |
| 2,519,931 | Roschen et al. | Aug. 22, 1950 |